(12) United States Patent
Maruyama et al.

(10) Patent No.: US 9,176,515 B2
(45) Date of Patent: Nov. 3, 2015

(54) ACCELERATOR PEDAL REACTION FORCE CONTROL DEVICE

(75) Inventors: Kohei Maruyama, Wako (JP); Naoto Sen, Wako (JP); Hideto Nebuya, Wako (JP); Toshihiko Sato, Wako (JP); Takayuki Yoshimura, Wako (JP); Go Suzaki, Wako (JP); Hirotaka Takiguchi, Wako (JP); Masaru Kanda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/130,675

(22) PCT Filed: Jun. 13, 2012

(86) PCT No.: PCT/JP2012/003845
§ 371 (c)(1),
(2), (4) Date: Jan. 2, 2014

(87) PCT Pub. No.: WO2013/005374
PCT Pub. Date: Jan. 10, 2013

(65) Prior Publication Data
US 2014/0109717 A1  Apr. 24, 2014

(30) Foreign Application Priority Data
Jul. 5, 2011 (JP) .................................. 2011-148936

(51) Int. Cl.
*G06F 7/70* (2006.01)
*G05D 1/00* (2006.01)
(Continued)

(52) U.S. Cl.
CPC ................ *G05G 1/40* (2013.01); *B60K 26/021* (2013.01); *B60K 2026/023* (2013.01); *B60W 30/146* (2013.01); *B60W 50/16* (2013.01); *Y10T 74/20534* (2015.01)

(58) Field of Classification Search
USPC ...................................... 701/70; 477/108, 120
See application file for complete search history.

(56) References Cited

U.S. PATENT DOCUMENTS 4,535,865 A * 8/1985 Tanigawa et al. ............. 180/177
2003/0190996 A1* 10/2003 Yone ............................ 477/120
(Continued)

FOREIGN PATENT DOCUMENTS

DE  102004026407  12/2005
DE  102010031080  3/2011
(Continued)

OTHER PUBLICATIONS

"World First ECO Pedal Helps Reduce Fuel Consumption", Nissan, 2008. URL: http://www.nissan-global.com, 2 pages.
(Continued)

*Primary Examiner* — Thomas G Black
*Assistant Examiner* — Tyler Paige
(74) *Attorney, Agent, or Firm* — Rankin, Hill & Clark LLP

(57) ABSTRACT

An accelerator pedal reaction force control device for controlling a depression reaction force of an accelerator pedal provided to a motor vehicle, the control device including: a reaction force actuator that provides the accelerator pedal with a depression reaction force; a target reaction force setting unit that sets a target depression reaction force; and a vehicle speed maintenance depression amount setting unit that sets an amount of depression of the accelerator pedal for maintaining a current vehicle speed as a vehicle speed maintenance depression amount, wherein, when a pedal depression amount exceeds the vehicle speed maintenance depression amount, the target reaction force setting unit performs a cruize assist whereby the target depression reaction force is set to a value of a cruize assist depression reaction force.

10 Claims, 11 Drawing Sheets

(51) Int. Cl.
*B60W 10/04* (2006.01)
*F16H 59/48* (2006.01)
*G05G 1/40* (2008.04)
*B60K 26/02* (2006.01)
*B60W 50/16* (2012.01)
*B60W 30/14* (2006.01)

(56) References Cited

U.S. PATENT DOCUMENTS

| | | | | |
|---|---|---|---|---|
| 2003/0236624 | A1* | 12/2003 | Kimura et al. | 701/301 |
| 2004/0254048 | A1* | 12/2004 | Yone | 477/108 |
| 2007/0213916 | A1* | 9/2007 | Sugano et al. | 701/96 |
| 2007/0276577 | A1* | 11/2007 | Kuge et al. | 701/96 |
| 2009/0125199 | A1* | 5/2009 | Kaigawa | 701/54 |
| 2010/0250085 | A1* | 9/2010 | Sugano et al. | 701/70 |
| 2011/0251747 | A1* | 10/2011 | Imai et al. | 701/22 |
| 2012/0116665 | A1* | 5/2012 | Aoki et al. | 701/301 |

FOREIGN PATENT DOCUMENTS

| | | |
|---|---|---|
| DE | 102010039643 | 2/2012 |
| JP | 2002-029278 | 1/2002 |
| JP | 2005-132225 | 5/2005 |
| JP | 2010-250762 | 11/2010 |
| JP | 2010-257375 | 11/2010 |

OTHER PUBLICATIONS

German Office Action dated Mar. 11, 2015, 10 pages.

* cited by examiner

ACCELERATOR PEDAL REACTION FORCE CONTROL DEVICE

TECHNICAL FIELD

The present invention relates to an accelerator pedal reaction force control device for controlling a reaction force of an accelerator pedal provided to a vehicle, and also relates to technology for improving fuel efficiency by appropriately increasing a depression reaction force.

BACKGROUND ART

In recent years, various accelerator pedal reaction force control devices that can variably control the reaction force of an accelerator pedal have been developed, and an invention has been proposed in which operation points for engagement and disengagement of a lock-up clutch and/or kickdown in an automatic transmission vehicle are identified, and, a depression reaction force varying means is controlled to vary the depression reaction force of the accelerator pedal in accordance with the operation points (see Patent Documents 1 and 2). In the invention disclosed in Patent Document 2, it is determined whether the operation points enter a fuel increase region (fuel efficiency deterioration region) defined from the relationship between an accelerator pedal stroke and an engine rotation speed, and varying of the depression reaction force of the accelerator pedal performed by the depression reaction force varying means is controlled in accordance with an operation point that has entered the region.

PRIOR ART DOCUMENT(S)

Patent Document(s)

Patent Document 1: JP2002-29278A
Patent Document 2: JP2005-132225A

BRIEF SUMMARY OF THE INVENTION

Task to be Accomplished by the Invention

In the invention disclosed in Patent Document 1, the aforementioned configuration prevents a driver from unintentionally depressing the accelerator pedal when an engine operation point is in the fuel efficiency deterioration region, to thereby improve fuel efficiency.

However, in a configuration adapted to start increasing the depression reaction force of the accelerator at the operation point for engagement and disengagement of the lock-up clutch disclosed in Patent Document 1 or at an operation point entering the fuel increase region, increase of the depression reaction force is not performed until the instant the driver attempts to accelerate the vehicle rapidly, and thus, it is difficult to improve fuel efficiency when the vehicle is cruising to maintain a constant speed. Further, rapid acceleration cannot be discouraged when the driver attempts to accelerate the vehicle, and thus, reduction in fuel efficiency cannot be avoided.

The present invention is made in view of the foregoing background, and an object of the present invention is to provide an accelerator pedal reaction force control device capable of improving fuel efficiency when the vehicle is cruising to maintain a constant speed or when the vehicle is accelerated, by increasing depression reaction force before the driver attempts to accelerate rapidly.

Means to Accomplish the Task

To achieve the above object, the present invention provides an accelerator pedal reaction force control device (1) for controlling a depression reaction force (Fr) of an accelerator pedal (2) provided to a motor vehicle, including: a reaction force providing means (3) that provides the accelerator pedal with a depression reaction force; a target depression reaction force setting means (16) that sets a target depression reaction force (Frt); a depression amount detection means (21) that detects an amount of depression of the accelerator pedal as a pedal depression amount ($\theta a$); a vehicle speed detection means (22) that detects a vehicle speed (V); and a vehicle speed maintenance depression amount setting means (12) that sets an amount of depression of the accelerator pedal for maintaining a current vehicle speed as a vehicle speed maintenance depression amount ($\theta \alpha$), wherein, when the pedal depression amount exceeds the vehicle speed maintenance depression amount, the target depression reaction force setting means performs a first increase process (step ST6) in which the target depression reaction force is increased by a first increase amount (Fr$\alpha$).

According to this configuration, when the accelerator pedal is depressed to such an extent that causes the vehicle to maintain the detected vehicle speed, a depression reaction force is not provided, and when the accelerator pedal is depressed further from that point, the depression reaction force is increased. Therefore, it is possible to make the driver notice excessive depression of the accelerator pedal through a tactile sense when the vehicle is cruising to maintain a constant speed, for example, and to discourage excessive depression of the accelerator pedal, thereby improving fuel efficiency.

According to one aspect of the present invention, the vehicle speed maintenance depression amount setting means may be configured to set a value obtained by adding a predetermined value ($\theta p$) to an amount of depression of the accelerator pedal for maintaining the current vehicle speed when the vehicle is traveling on a flat road ($\theta \alpha'$) as the vehicle speed maintenance depression amount.

In a case where the amount of depression of the accelerator pedal for maintaining the vehicle speed when the vehicle is traveling on a flat road is set as the vehicle speed maintenance depression amount without modification, when there is a change in a road slope, engine output, loading state of the motor vehicle, etc., a depression reaction force may be provided to the accelerator pedal before the amount of pedal depression that can maintain the vehicle speed is reached, and this may give an uncomfortable feeling to the driver. In the foregoing structure in which a value obtained by adding a predetermined value to an amount of depression of the accelerator pedal for maintaining the vehicle speed when the vehicle is traveling on a flat road is set as the vehicle speed maintenance depression amount, a depression reaction force is not provided to the accelerator pedal till a pedal depression amount that can maintain the vehicle speed is reached even when there is some change in a road slope, engine output, and/or loading state of the motor vehicle, and thus, it is possible to avoid giving an uncomfortable feeling to the driver.

Further, according to one aspect of the present invention, the vehicle speed maintenance depression amount may be set such that the vehicle speed maintenance depression amount increases with increase in the vehicle speed.

The amount of depression of the accelerator pedal for maintaining the vehicle speed when the vehicle is traveling on a flat road tends to increase as the vehicle speed increases.

Therefore, by similarly increasing the vehicle speed maintenance depression amount with increase in the vehicle speed, it is possible to set the vehicle speed maintenance depression amount at an appropriate value in accordance with the vehicle speed.

Further, according to one aspect of the present invention, the accelerator pedal reaction force control device may be configured to further include a traveling state determination means (11) that determines whether the motor vehicle is in a state in which it is easy to make the vehicle travel at a constant speed, wherein, when it is determined by the traveling state determination means that the vehicle is not in the state in which it is easy to make the vehicle travel at a constant speed, the target depression reaction force setting means does not perform the first increase process.

According to this configuration, under circumstances where it is difficult to make the vehicle travel at a constant speed, such as when the vehicle is traveling at a low speed, when the vehicle is traveling on a road with a changing slope or when the vehicle is traveling on a curved road, provision of the depression reaction force based on the vehicle speed maintenance depression amount is not performed. Therefore, it is possible to avoid frequently providing a depression reaction force to the accelerator pedal and giving an uncomfortable feeling to the driver.

Further, according to one aspect of the present invention, the traveling state determination means may be configured to acquire a road slope, and determine that the vehicle is in a state in which it is difficult to make the vehicle travel at a constant speed when a road on which the vehicle is traveling currently has an upward slope (step ST5).

When the road on which the vehicle is currently traveling has an upward slope, the driving resistance is large and a drive force larger than when the vehicle is traveling on a flat road is necessary. By using the road slope in the determination as described in the foregoing, it is possible to readily determine whether the vehicle is in a state in which it is easy to make the vehicle travel at a constant speed.

Further, according to one aspect of the present invention, the target depression reaction force setting means may be configured so as not to perform the first increase process when the vehicle speed obtained by the vehicle speed detection means is lower than a first vehicle speed.

When the vehicle is traveling in low and middle engine speed ranges, it is often the case that the vehicle does not travel at a constant speed, and, if the first increase process were performed, it would hamper intentional acceleration and annoy the driver. According to the foregoing configuration, it is possible to avoid annoying the driver when the vehicle is traveling in low and middle engine speed ranges, while discouraging excessive depression of the accelerator pedal when the vehicle is traveling in a high speed range.

Further, according to one aspect of the present invention, the accelerator pedal reaction force control device may be configured to further include an acceleration depression amount setting means (13) that sets an amount of depression of the accelerator pedal for accelerating the motor vehicle from a current vehicle speed as an acceleration depression amount ($\theta\beta$), wherein, when the pedal depression amount exceeds the acceleration depression amount, the target depression reaction force setting means performs a second increase process (step ST7) in which the target depression reaction force is increased by a second increase amount ($Fr\beta$) larger than the first increase amount.

According to this configuration, when the driver attempts to accelerate the vehicle by depressing the accelerator pedal beyond the vehicle speed maintenance depression amount, if the driver attempts to depress the accelerator pedal beyond the acceleration depression amount, which is larger than the vehicle speed maintenance depression amount, a larger depression reaction force is provided, and thus, it is possible to suppress reduction in fuel efficiency caused by excessive depression of the accelerator pedal.

Further, according to one aspect of the present invention, the acceleration depression amount setting means may be configured to set the acceleration depression amount such that an increase gradient (S) indicating an increase in the acceleration depression amount relative to an increase in the vehicle speed is smaller in a low speed range than in a high speed range.

When the motor vehicle is started from a stopped state or when the motor vehicle is traveling in a low speed range, an increase in the drive force required to accelerate the motor vehicle is large, while when the vehicle is traveling in a high speed range, an increase in the drive force for further accelerating the motor vehicle is small. Therefore, by adopting the foregoing structure, it is possible to set the acceleration depression amount at an appropriate value in accordance with the vehicle speed, and to discourage the driver from depressing the accelerator pedal more than necessary over a wider range of vehicle speed, while satisfying the demands of the driver.

Further, according to one aspect of the present invention, the accelerator pedal reaction force control device may be configured to further include: a cruising state determination means (14) that determines that the motor vehicle is in a cruising state when the vehicle speed is maintained within a predetermined vehicle speed range for a predetermined time period; an acceleration detection means (23) that detects an acceleration (G) of the motor vehicle; and an acceleration state determination means (15) that determines that the motor vehicle is in an acceleration state when a state in which the acceleration is larger than or equal to a predetermined value has continued for a predetermined time period, wherein the target depression reaction force setting means performs the first increase process only when it is determined by the cruising state determination means that the motor vehicle is in the cruising state (step ST1: Yes), and performs the second increase process only when it is determined by the acceleration state determination means that the motor vehicle is in the acceleration state (step ST2: Yes).

According to this configuration, when the driver is operating the vehicle in such a manner that the vehicle speed is changed frequently, the depression reaction force is not provided, and therefore, it is possible to avoid giving an uncomfortable feeling to the driver or annoying the driver.

Also, to achieve the above object, the present invention provides an accelerator pedal reaction force control device (1) for controlling a depression reaction force (Fr) of an accelerator pedal (2) provided to a motor vehicle, including: a reaction force providing means (3) that provides the accelerator pedal with a depression reaction force; a target depression reaction force setting means (16) that sets a target depression reaction force (Frt); a depression amount detection means (21) that detects an amount of depression of the accelerator pedal as a pedal depression amount ($\theta$a); a vehicle speed detection means (22) that detects a vehicle speed (V); and an acceleration depression amount setting means (13) that sets an amount of depression of the accelerator pedal for accelerating the motor vehicle from a current vehicle speed as an acceleration depression amount ($\theta\beta$), wherein, when the pedal depression amount exceeds the acceleration depression amount, the target depression reaction force setting means increases the target depression reaction force (step ST7).

According to this configuration, when the driver attempts to accelerate the vehicle, if the driver attempts to depress the accelerator pedal beyond the acceleration depression amount, a depression reaction force is provided, and thus, it is possible to make the driver notice excessive depression of the accelerator pedal through a tactile sense. Consequently, excessive depression of the accelerator pedal can be discouraged, and hence, reduction in fuel efficiency at the time of acceleration can be improved.

Further, according to one aspect of the present invention, the acceleration depression amount setting means may be configured to set the acceleration depression amount such that an increase gradient (S) indicating an increase in the acceleration depression amount relative to an increase in the vehicle speed is smaller in a low speed range than in a high speed range.

According to this configuration, it is possible to set the acceleration depression amount at an appropriate value in accordance with the vehicle speed, and to discourage the driver from depressing the accelerator pedal more than necessary over a wider range of vehicle speed, while satisfying the demands of the driver.

Further, according to one aspect of the present invention, the accelerator pedal reaction force control device may be configured to further include a vehicle speed maintenance depression amount setting means that sets an amount of depression of the accelerator pedal for maintaining a current vehicle speed as a vehicle speed maintenance depression amount, wherein, when the pedal depression amount exceeds the vehicle speed maintenance depression amount, the target depression reaction force setting means increases the target depression reaction force by a first increase amount, and when the pedal depression amount exceeds the acceleration depression amount, the target depression reaction force setting means increases the target depression reaction force by a second increase amount larger than the first increase amount.

According to this configuration, when the accelerator pedal is depressed by an amount greater than or equal to the vehicle speed maintenance depression amount, the depression reaction force is increased. Therefore, it is possible to make the driver notice excessive depression of the accelerator pedal through a tactile sense. Further, when the driver attempts to accelerate the vehicle by depressing the accelerator pedal beyond the vehicle speed maintenance depression amount, a larger depression reaction force is generated to suppress reduction in fuel efficiency.

Effect of the Invention

As described in the foregoing, according to the accelerator pedal reaction force control device according to the present invention, it is possible to improve fuel efficiency when the vehicle is cruising to maintain a constant speed or when the vehicle is accelerated, by increasing depression reaction force before the driver attempts to accelerate rapidly.

EMBODIMENTS FOR CARRYING OUT THE INVENTION

Now, a detailed description will be given of a first embodiment of an accelerator pedal reaction force control device 1 according to the present invention.

Figure 1:
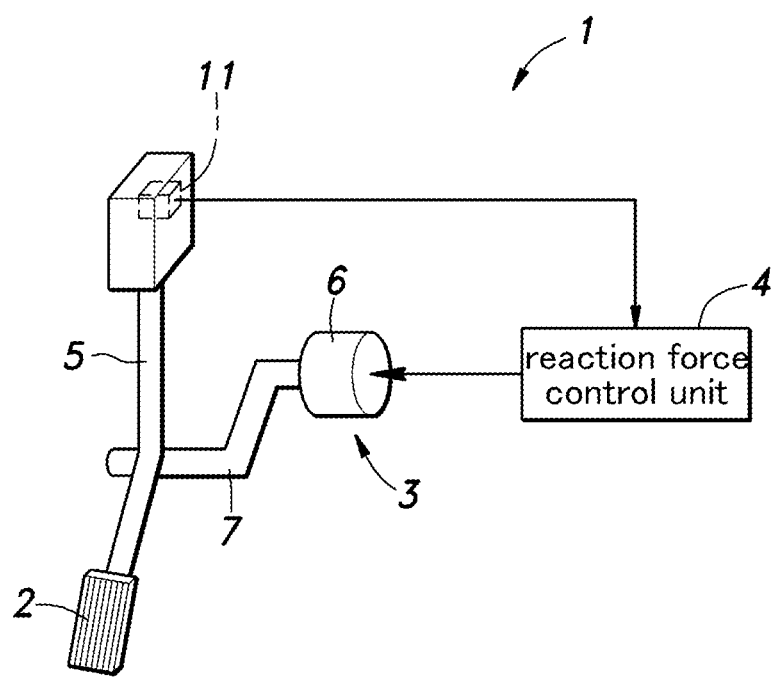
FIG. 1 is a schematic diagram showing a configuration of an accelerator pedal reaction force control device according to the present invention.
Figure 2:
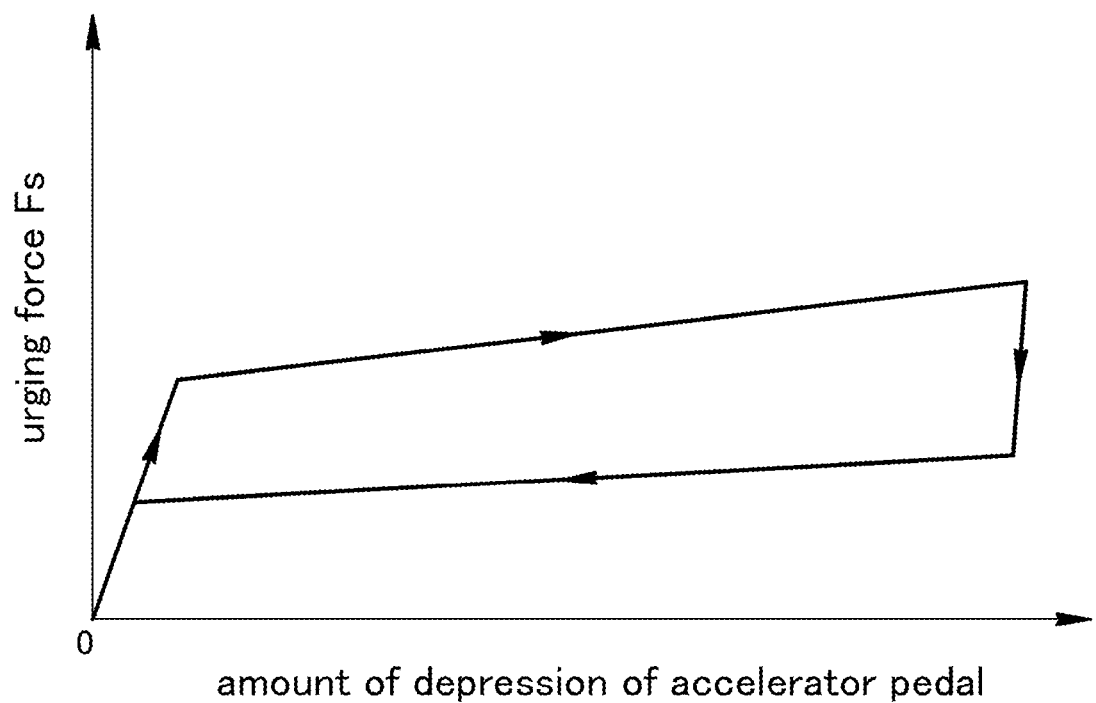
FIG. 2 is a graph showing an urging force in relation to an amount of depression of an accelerator pedal shown in FIG. 1.

As shown in FIG. 1, the accelerator pedal reaction force control device 1 is for providing an accelerator pedal 2 disposed in a motor vehicle with a depression reaction force Fr resisting a depressing force, and includes a reaction force actuator 3 serving as a reaction force providing means for providing the accelerator pedal 2 with the depression reaction force Fr, and a reaction force control unit 4 for performing control to cause the reaction force actuator 3 to generate the depression reaction force Fr. It is to be noted that the motor vehicle is not limited to that using an internal combustion engine as a drive source, and may be an electric vehicle that uses an electric motor as a drive source or a hybrid vehicle that uses both an internal combustion engine and an electric motor.

The accelerator pedal 2 has a lower end pivotally mounted to a vehicle body and an upper part connected to a the pedal arm 5, and is always urged toward an original position (upright position) via the pedal arm 5 urged by a return spring not shown in the drawings. It is to be noted that this urging force Fs has a hysteresis in which the urging force Fs becomes large when the accelerator pedal 2 is moved in the direction of depression and small when the accelerator pedal 2 is moved in the returning direction. This hysteresis may be caused by a mechanical structure of a conventional cable-type pedal device, or may be caused by an urging force generation device of a drive-by-wire type pedal device.

The reaction force actuator 3 includes a rotary electric motor 6 and a pivot arm 7 connected to an output shaft of the electric motor 6, such that, when the electric motor 6 applies rotation torque to the pivot arm 7, the pivot arm 7 comes into slidable contact with the pedal arm 5 to provide the accelerator pedal 2 with the depression reaction force Fr.

Figure 3:
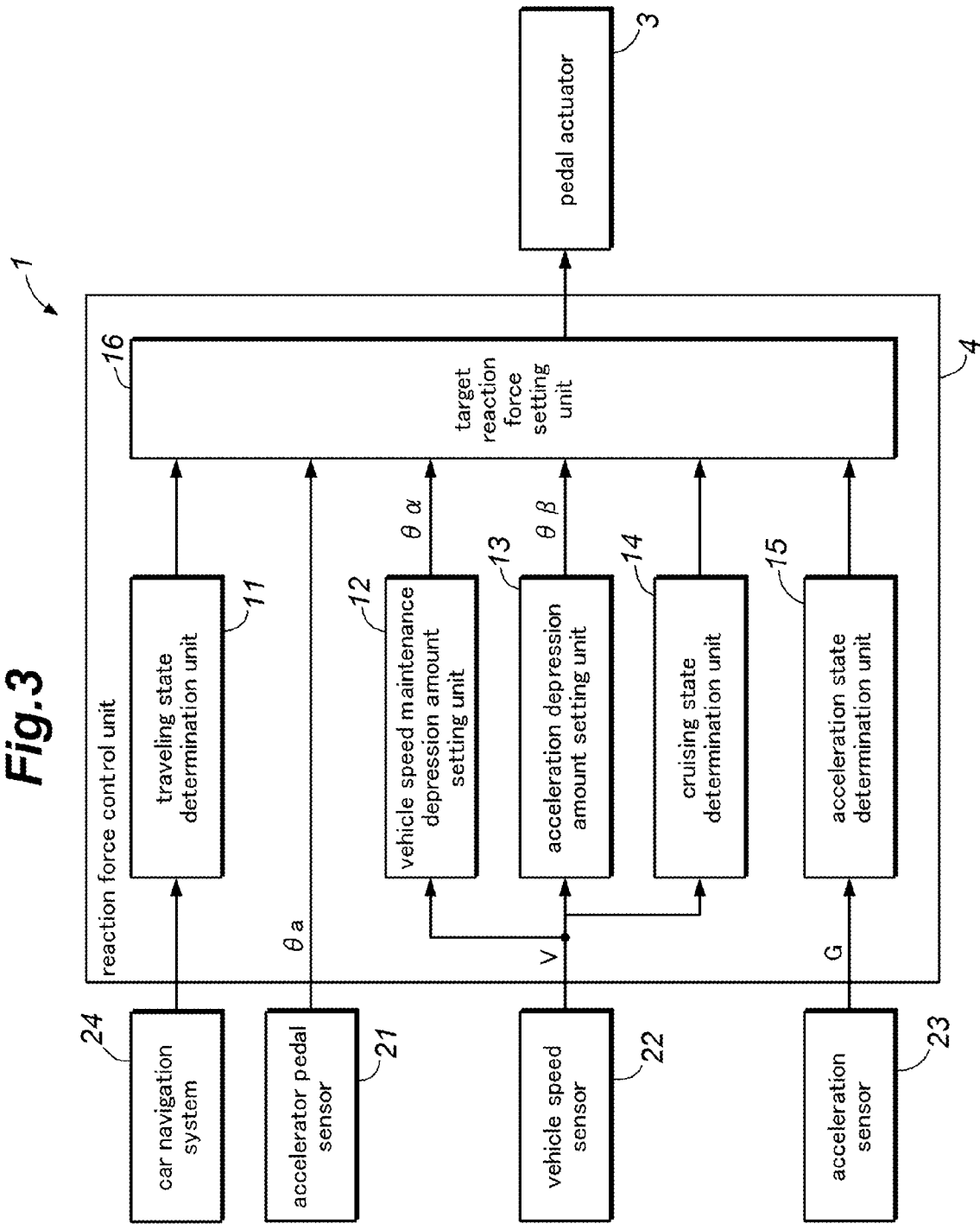
FIG. 3 is a schematic block diagram of the accelerator pedal reaction force control device shown in FIG. 1.

The reaction force control unit 4 is constituted of a CPU, a ROM, a RAM, a peripheral circuit, an input/output interface, various drivers and so on. As shown in FIG. 3, the reaction force control unit 4 includes a traveling state determination unit 11 that determines a traveling state of the motor vehicle, a vehicle speed maintenance depression amount setting unit 12 that sets a vehicle speed maintenance depression amount θα, an acceleration depression amount setting unit 13 that sets an acceleration depression amount θβ, a cruising state determination unit 14 that determine whether the motor vehicle is in a cruising state, an acceleration state determination unit 15 that determines whether the motor vehicle is in an acceleration state, and a target reaction force setting unit 16 that sets a target depression reaction force Frt, and controls operation of the reaction force actuator 3 such that the set target depression reaction force Frt is provided to the accelerator pedal 2.

The reaction force control unit 4 is configured to receive signals from an accelerator pedal sensor 21 that detects the amount of depression of the accelerator pedal 2 as a pedal depression amount θa, a vehicle speed sensor 22 that detects a traveling speed (vehicle speed V) of the motor vehicle, an acceleration sensor 23 that detects a fore-and-aft acceleration G (hereinafter, simply referred to as an acceleration G) of the motor vehicle, and a car navigation system 24 for constituting a traveling state determination means.

The traveling state determination unit 11 determines, based on road data such as road slopes included in the map data stored in the car navigation system 24, whether the driving resistance caused by the road on which the vehicle is traveling currently is larger than the driving resistance when the vehicle is traveling on a flat road; namely, whether the motor vehicle is in a state in which it is easy to make the vehicle travel at a constant speed. For example, when the road on which the vehicle is traveling currently has an upward slope, the driving resistance is large and a drive force larger than when the vehicle is traveling on a flat road is necessary, and therefore, it is determined that the vehicle is in a state in which it is difficult to make the vehicle travel at a constant speed. On the other hand, when the road on which the vehicle is traveling currently is flat or has a downward slope, it is determined that the vehicle is in a state in which it is easy to make the vehicle travel at a constant speed.

Figure 4:
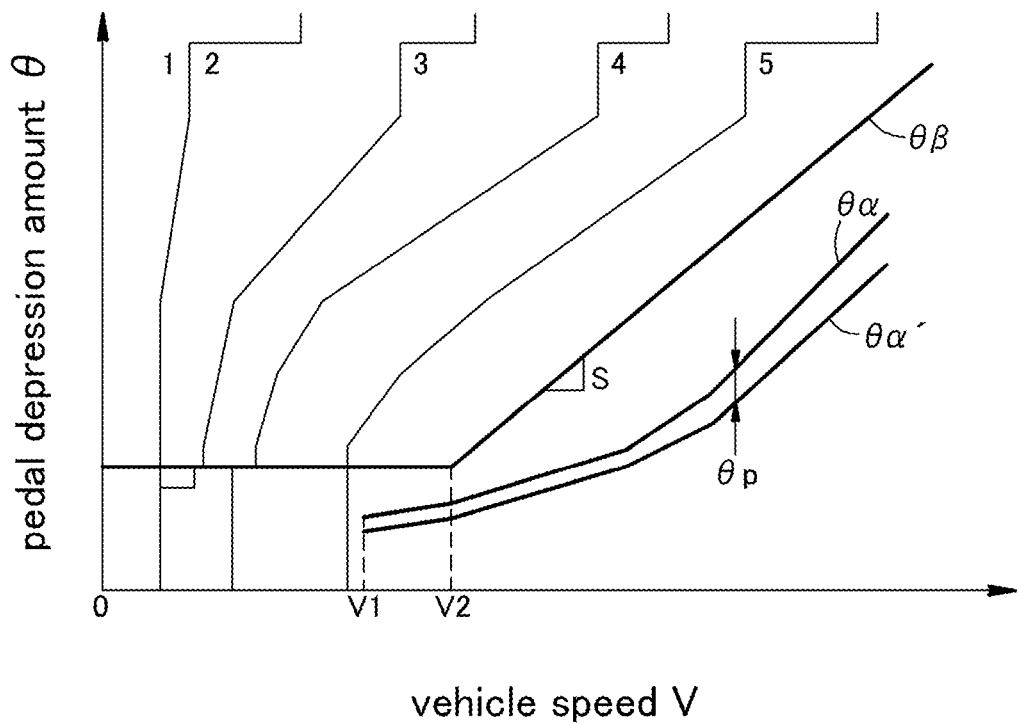
FIG. 4 is a map showing the relationship between a vehicle speed and respective pedal depression amounts.

The vehicle speed maintenance depression amount setting unit 12 refers to the map shown in FIG. 4 using the vehicle speed V as an address, and sets an amount of depression of the accelerator pedal 2 for maintaining the current vehicle speed V as a vehicle speed maintenance depression amount θα. The vehicle speed maintenance depression amount θα is a value that increases as the vehicle speed V increases.

It is to be noted here that the vehicle speed maintenance depression amount θα is set as a value obtained by adding a predetermined value θp to a flat road vehicle speed maintenance depression amount θα' (a value that increases as the vehicle speed V increases), which is an amount of depression of the accelerator pedal 2 for maintaining the current vehicle speed V when the vehicle is traveling on a flat road. This is because if the flat road vehicle speed maintenance depression amount θα' is set as the vehicle speed maintenance depression amount without modification, when there is a change in a road slope, engine output, loading state of the motor vehicle, etc., a later-described cruise assist depression reaction force Frα may be provided to the accelerator pedal 2 before the amount of pedal depression that can maintain the vehicle speed V is reached, and this may give an uncomfortable feeling or discomfort to the driver.

The predetermined value θp that is added to the flat road vehicle speed maintenance depression amount θα' is determined such that a drive force sufficient to maintain a constant speed can be obtained even when there is some change in the traveling state of the motor vehicle, such as the road slope, engine output, or loading state of the motor vehicle, and, similarly to the flat road vehicle speed maintenance depression amount θα', is increased as the vehicle speed V increases. By setting the vehicle speed maintenance depression amount θα as described above, it is possible not to provide a depression reaction force till a pedal depression amount that can maintain the vehicle speed V is reached even when there is some change in traveling state.

The acceleration depression amount setting unit 13 refers to the map shown in FIG. 4 using the vehicle speed V as an address, and sets an amount of depression of the accelerator pedal 2 for accelerating the motor vehicle as an acceleration depression amount θβ. It is to be noted that the numerals in FIG. 4 indicate gear shift stages of an automatic transmission, and the acceleration depression amount θβ is set so as to be smaller than a value of a pedal depression amount θa at which shift down is performed over the substantially entire vehicle speed range.

Further, the acceleration depression amount θβ is set such that an increase gradient S indicating an increase in the acceleration depression amount θβ relative to an increase in the vehicle speed V is smaller in a low speed range than in a high speed range. In the illustrated embodiment, the increase gradient S is set to zero in a speed range lower than a second predetermined vehicle speed V2 and is set to a constant value larger than zero in a speed range higher than the second predetermined vehicle speed V2.

Figure 5:
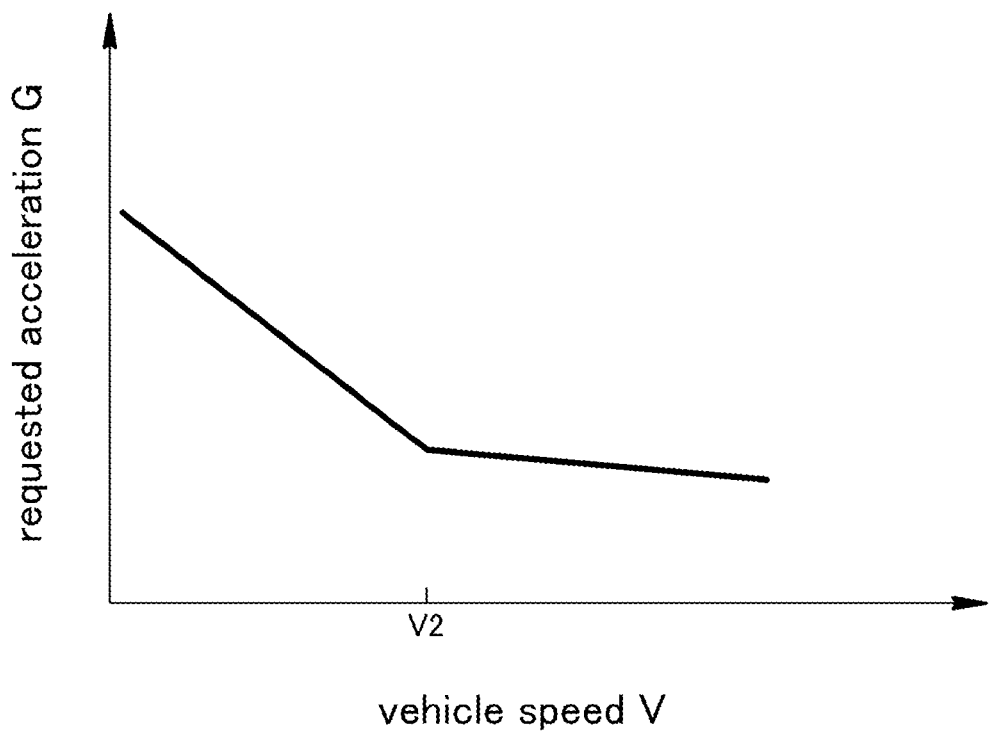
FIG. 5 is a graph showing the relationship between a vehicle speed and a requested acceleration.

This is because, as shown in FIG. 5, when the motor vehicle is started from a stopped state or when the motor vehicle is traveling in a low speed range (a speed range lower than the second predetermined vehicle speed V2), a required acceleration or an increase in the drive force required to accelerate the motor vehicle is large, while when the vehicle is traveling in a high speed range (a speed range higher than the second predetermined vehicle speed V2), a required acceleration or an increase in the drive force required to further accelerate the motor vehicle is small. By setting the acceleration depression amount θβ as described in the foregoing, it is possible to set the acceleration depression amount θβ at an appropriate value in accordance with the vehicle speed V, and to discourage the driver from depressing the accelerator pedal 2 more than necessary over a wider range of vehicle speed, while satisfying the demands of the driver.

The cruising state determination unit 14 determines that the motor vehicle is in the cruising state when the vehicle speed V is maintained within a predetermined vehicle speed range (e.g., maximum vehicle speed Vmax−minimum vehicle speed Vmin<5 km/h) for a predetermined time period (e.g., 10 sec).

The acceleration state determination unit 15 determines that the motor vehicle is in the acceleration state when a state in which the acceleration G is larger than or equal to a predetermined value (e.g., 0.1 G) continues for a predetermined time period (e.g., 1 sec).

The target reaction force setting unit 16 sets the target depression reaction force Frt on the basis of the pedal depression amount θa, the result of determination of the traveling state determination unit 11, the vehicle speed maintenance depression amount θα, the acceleration depression amount θβ, and the result of determination of the cruising state determination unit 14 and the acceleration state determination unit 15.

Figure 6:
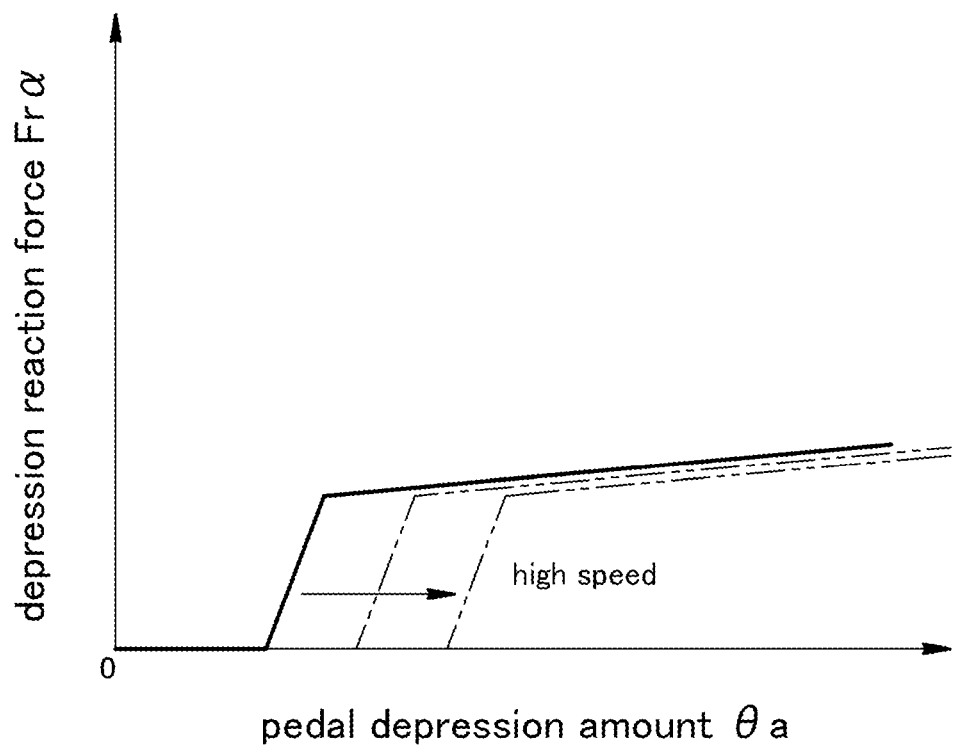
FIG. 6 is a map showing the relationship between a pedal depression amount and a cruise assist depression reaction force.
Figure 7:
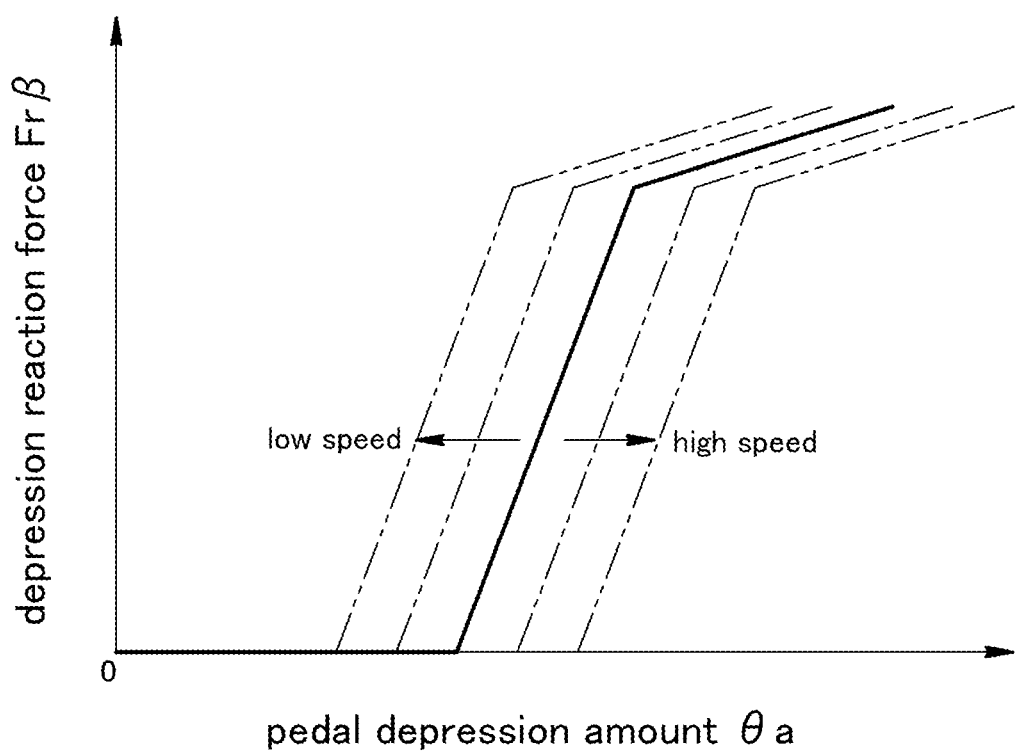
FIG. 7 is a map showing the relationship between a pedal depression amount and an eco-acceleration assist depression reaction force.

For instance, the target reaction force setting unit 16 may set the target depression reaction force Frt to a depression reaction force defined as shown in FIG. 6 (first increase amount; hereinafter referred to as a cruise assist depression reaction force Frα) such that a cruise assist (first increase process) for increasing the depression reaction force Fr of the accelerator pedal 2 is performed when the pedal depression amount θa exceeds the vehicle speed maintenance depression amount θα, or may set the target depression reaction force Frt to a depression reaction force defined as shown in FIG. 7 (second increase amount; hereinafter referred to as an eco-acceleration assist depression reaction force Frβ) such that an eco-acceleration assist (second increase process) for increasing the depression reaction force Fr of the accelerator pedal 2 is performed when the pedal depression amount θa exceeds the acceleration depression amount θβ.

Figure 8:
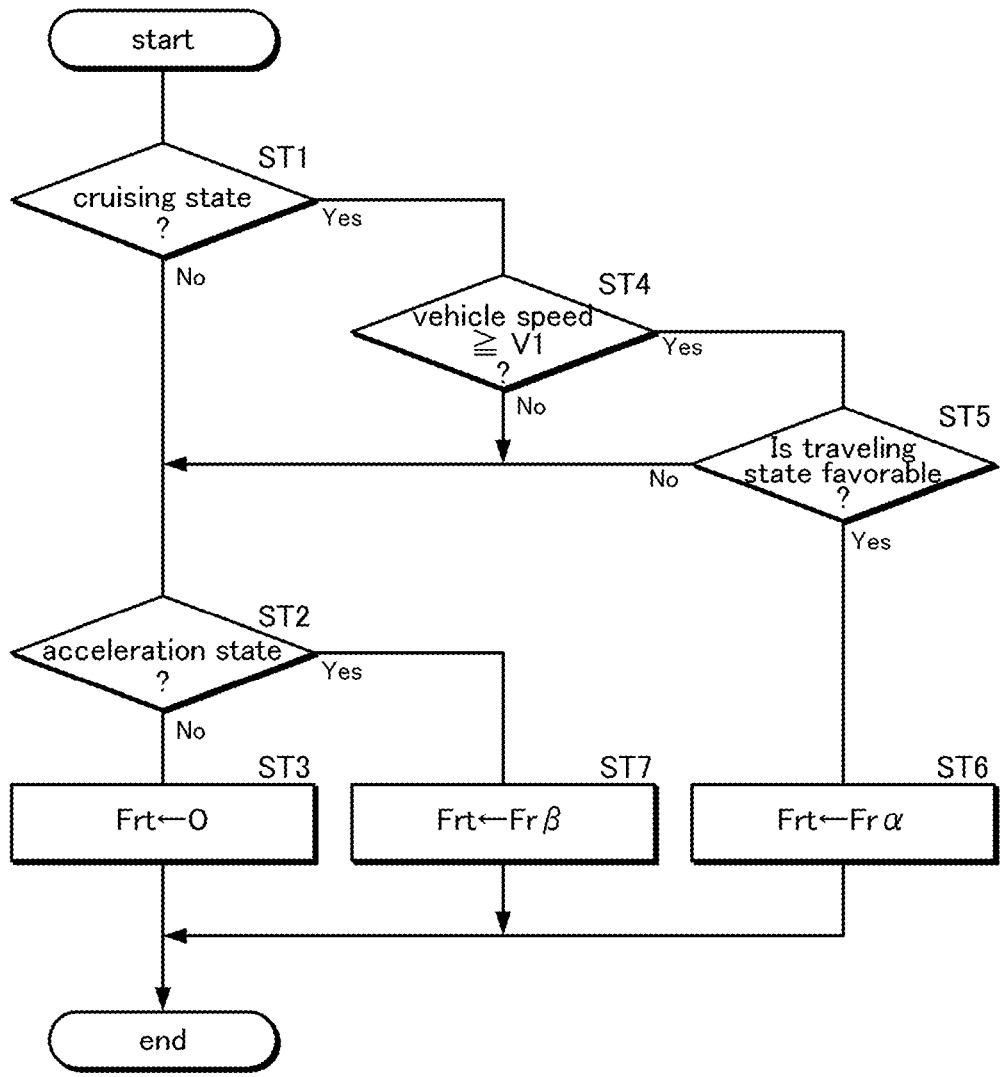
FIG. 8 is a flowchart showing a setting procedure performed by a target depression reaction force setting unit shown in FIG. 3.

Next, with reference to the flowchart of FIG. 8, description will be made of a procedure performed by the target reaction force setting unit 16 to set the target depression reaction force Frt. First, the target reaction force setting unit 16 determines whether it is determined by the cruising state determination unit 14 that the motor vehicle is in the cruising state (step ST1). If the motor vehicle is not in the cruising state (step ST1: No), then, the target reaction force setting unit 16 determines whether it is determined by the acceleration state determination unit 15 that the motor vehicle is in the acceleration state (step ST2), and if the motor vehicle is not in the acceleration state (No), sets the target depression reaction force Frt to zero (step ST3).

If it is found in step ST1 that the motor vehicle is in the cruising state (Yes), the target reaction force setting unit 16 determines whether the vehicle speed V is higher than or equal to a first predetermined vehicle speed V1 (step ST4). The significance of this determination will be described later. If the result of determination in step ST4 is No, the process proceeds to step ST2, and if the result of determination in step ST4 is Yes, it is determined whether it is determined from the traveling state that the motor vehicle is in a state in which it is easy to make the vehicle travel at a constant speed (step ST5). If it is found in step ST5 that the motor vehicle is not in a state in which it is easy to make the vehicle travel at a constant speed (No), the process proceeds to step ST2, and if it is found that the motor vehicle is in a state in which it is easy to make the vehicle travel at a constant speed (Yes), the target reaction force setting unit 16 refers to the map of FIG. 6 and sets the target depression reaction force Frt to a value of the cruise assist depression reaction force Frα when the pedal depression amount θa exceeds the vehicle speed maintenance depression amount θα (step ST6).

On the other hand, if it is found in step ST2 that the motor vehicle is in the acceleration state (Yes), the target reaction force setting unit 16 refers to the map of FIG. 7 and sets the target depression reaction force Frt to a value of the eco-acceleration assist depression reaction force Frβ when the pedal depression amount θa exceeds the acceleration depression amount θβ (step ST7).

The cruise assist depression reaction force Frα and the eco-acceleration assist depression reaction force Frβ are determined by referring to the maps shown in FIGS. 6 and 7, respectively, using the vehicle speed V and the pedal depression amount θa as addresses, as described in the foregoing. It is to be noted that each of the cruise assist depression reaction force Frα and the eco-acceleration assist depression reaction force Frβ shifts to the right in the graph as the vehicle speed V increases. Namely, a larger pedal depression amount θa is required to start increasing them in accordance with the map of FIG. 4.

The cruise assist depression reaction force Frα is defined such that it starts increasing from a smaller pedal depression amount θa compared to the eco-acceleration assist depression reaction force Frβ, and in a pedal depression range in which both of them are increase, the eco-acceleration assist depression reaction force Frβ has a higher value (increase amount) than the cruise assist depression reaction force Frα.

Figure 9:
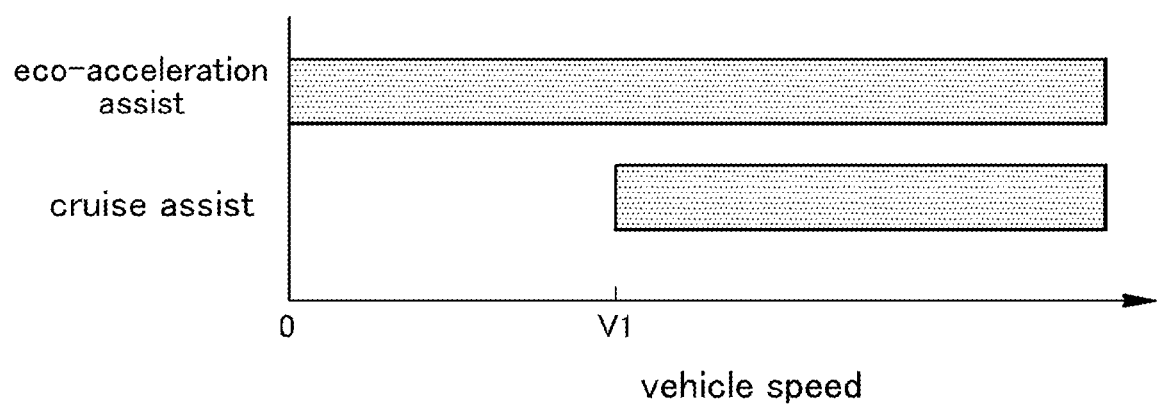
FIG. 9 is a diagram explaining vehicle speeds at which each assist may be applicable.

Further, as indicated by their respective applicable vehicle speed regions shown in FIG. 9, the eco-acceleration assist may be performed in low and middle engine speed ranges where the vehicle speed V is lower than the first predetermined vehicle speed V1, which is a determination threshold value in step ST4, but the cruise assist is not performed in the low and middle engine speed ranges and may be performed only in a high speed range where the vehicle speed V is higher than the first predetermined vehicle speed V1 (also see FIG. 4). This is because, when the vehicle is driving in the low and middle engine speed ranges, it is often the case that the vehicle does not travel at a constant speed, and, if the cruise assist were performed, it would hamper intentional acceleration and annoy the driver.

Figure 10:
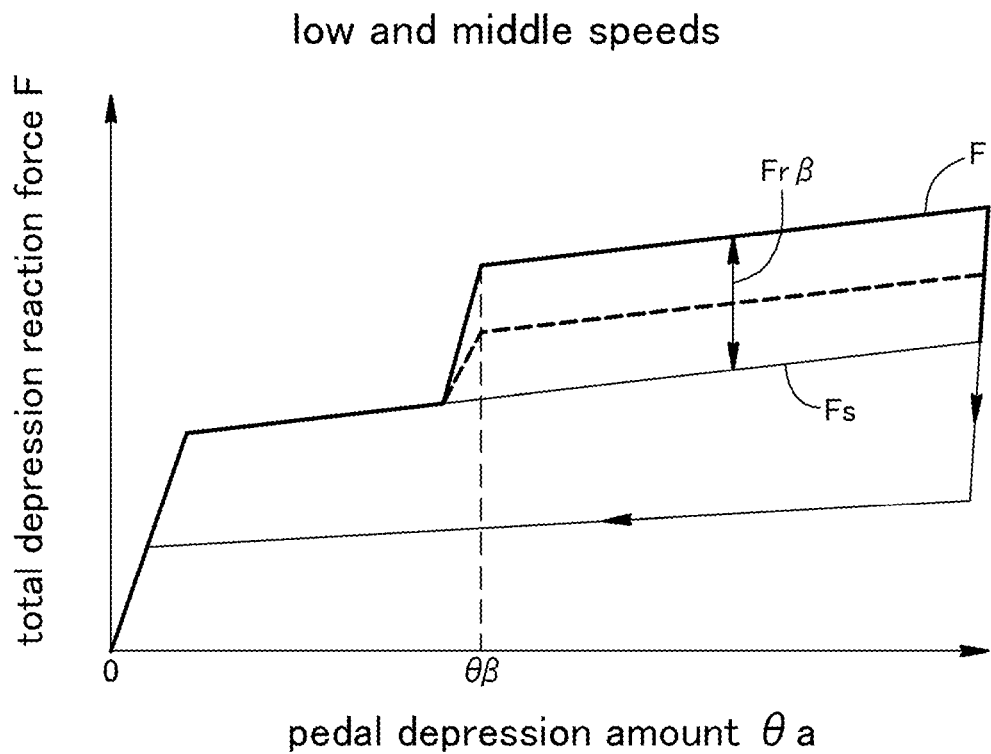
FIG. 10 is a graph showing a total depression reaction force of the accelerator pedal in low and middle engine speed ranges.

Therefore, as shown in FIG. 10, when the vehicles speed is in the low and middle engine speed ranges, in a region in which the pedal depression amount θa is smaller than the acceleration depression amount θβ that changes in accordance with the vehicle speed V, only the urging force Fs is applied to the accelerator pedal 2, and in a region in which the pedal depression amount θa is larger than the acceleration depression amount θβ, a total depression reaction force F obtained by adding the eco-acceleration assist depression reaction force Frβ to the urging force Fs is applied.

Figure 11:
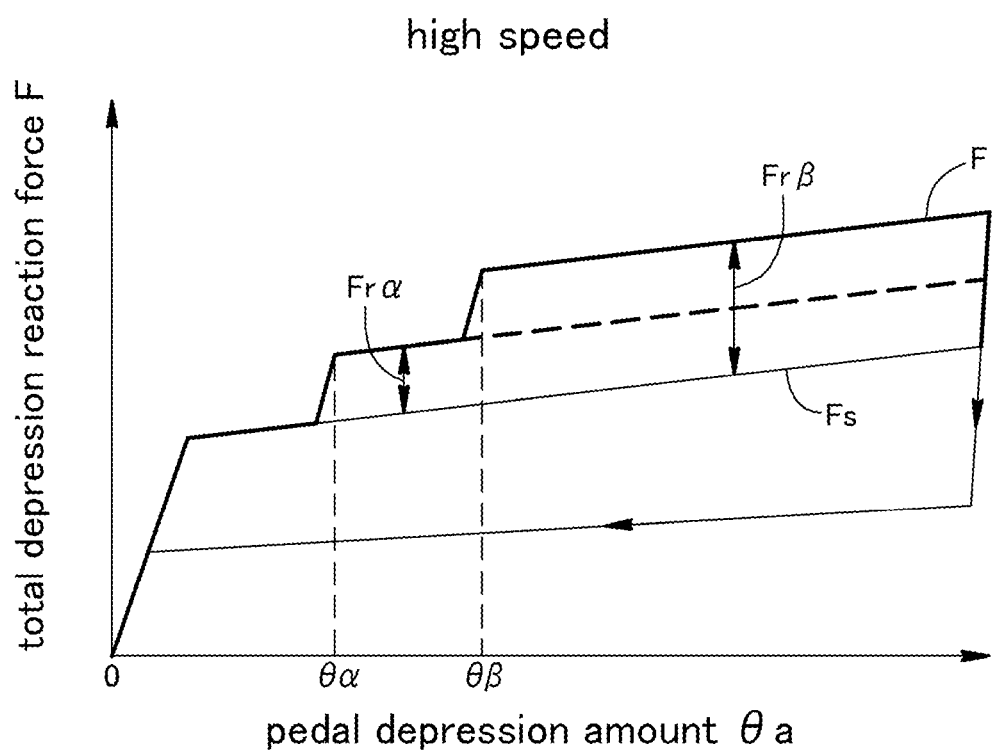
FIG. 11 is a graph showing a total depression reaction force of the accelerator pedal in a high speed range.

On the other hand, as shown in FIG. 11, in the high speed range, in a region in which the pedal depression amount θa is smaller than the vehicle speed maintenance depression amount θα that changes in accordance with the vehicle speed V, only the urging force Fs is applied to the accelerator pedal 2, in a region in which the pedal depression amount θa is larger than the vehicle speed maintenance depression amount θα and smaller than the acceleration depression amount θβ, a total depression reaction force F obtained by adding the cruise assist depression reaction force Frα to the urging force Fs is applied, and in a range in which the pedal depression amount θa is larger than the acceleration depression amount θβ, a total depression reaction force F obtained by adding the eco-acceleration assist depression reaction force Frβ to the urging force Fs is applied.

As described in the foregoing, when the accelerator pedal 2 is depressed to such an extent that causes the vehicle to maintain the current vehicle speed V, the depression reaction force Fr is not provided, and when the accelerator pedal 2 is depressed beyond the vehicle speed maintenance depression amount θα, the depression reaction force Fr is increased by the cruise assist depression reaction force Frα, and thus, it is possible to make the driver notice excessive depression of the accelerator pedal 2 through a tactile sense when the motor vehicle is in the cruising state, for example, and discourage excessive depression to thereby improve fuel efficiency.

Further in the case where the vehicle speed maintenance depression amount θα is set to a value obtained by adding the predetermined value θp to the flat road vehicle speed maintenance depression amount θα', the depression reaction force Frα is not provided to the accelerator pedal till a pedal depression amount θa that can maintain the vehicle speed V is reached even when there is some change in the road slope, engine output, and/or loading state of the motor vehicle, and thus, it is possible to avoid giving an uncomfortable feeling to the driver.

Further, when the motor vehicle is not in a state in which it is easy make the vehicle travel at a constant speed (step ST5: No), the target reaction force setting unit 16 does not perform the cruise assist in which the target depression reaction force Frt is set to a value of the cruise assist depression reaction force Frα, and therefore, under circumstances where it is difficult to make the vehicle travel at a constant speed, such as when the vehicle is traveling at a low speed, when the vehicle is traveling on a road with a changing slope or when the vehicle is traveling on a curved road, it is possible to avoid frequently providing the depression reaction force Fr based on the cruise assist depression reaction force Frα to the accelerator pedal 2 and giving an uncomfortable feeling to the driver.

In addition, when the pedal depression amount θa exceeds the acceleration depression amount θβ that is larger than the vehicle speed maintenance depression amount θα, the eco-acceleration assist is performed whereby the target depression reaction force Frt is set to the eco-acceleration assist depression reaction force Frβ that is larger than the cruise assist depression reaction force Frα. Thereby, when the driver attempts to depress the accelerator pedal 2 beyond the acceleration depression amount θβ, a larger depression reaction force Fr is provided, and thus, it is possible to suppress reduction in fuel efficiency caused by excessive depression of the accelerator pedal 2.

Further, in the case where the cruise assist is performed (step ST6) only when the motor vehicle is in the cruising state (step ST1: Yes) and the eco-acceleration assist is performed only when the motor vehicle is in the acceleration state (step ST2: Yes), when the driver is operating the vehicle in such a manner that the vehicle speed V is changed frequently, the depression reaction force Fr is not provided, and therefore, it is possible to avoid giving an uncomfortable feeling to the driver or annoying the driver.

Concrete embodiments of the present invention have been described in the foregoing, but the present invention is not limited by the foregoing embodiments, and the concrete type, shape, arrangement, etc. of each member may be changed as appropriate without departing from the spirit of the present invention. For example, in the foregoing embodiment, the reaction force actuator 3 is configured to include the electric motor 6, but it may be configured as a linear electric actuator constituted of an electromagnetic solenoid, a moving coil and/or a linear motor, or may be configured as a hydraulic actuator or a pneumatic actuator. Further, not all of the structural elements and processing steps of the accelerator pedal reaction force control device 1 shown in the foregoing embodiment of the present invention are necessarily indispensable, and they may be selectively used as appropriate without departing from the spirit of the present invention.

GLOSSARY 1 accelerator pedal reaction force control device
2 accelerator pedal
3 reaction force actuator (reaction force providing means)
4 reaction force control unit
11 traveling state determination unit
12 vehicle speed maintenance depression amount setting unit
13 acceleration depression amount setting unit
14 the cruising state determination unit
15 the acceleration state determination unit
16 target reaction force setting unit
21 accelerator pedal sensor
22 vehicle speed sensor
23 acceleration sensor
θa pedal depression amount
θα vehicle speed maintenance depression amount
θα' flat road vehicle speed maintenance depression amount
θp predetermined value
θβ acceleration depression amount
Fs urging force
Fr depression reaction force
Frt target depression reaction force
Frα cruise assist depression reaction force (first increase amount)
Frβ eco-acceleration assist depression reaction force (second increase amount)
V vehicle speed

The invention claimed is:

1. An accelerator pedal reaction force control device for controlling a depression reaction force of an accelerator pedal provided to a motor vehicle, comprising:
    a reaction force providing unit that provides the accelerator pedal with a depression reaction force;
    a target depression reaction force setting unit that sets a target depression reaction force;
    a depression amount detection unit that detects an amount of depression of the accelerator pedal as a pedal depression amount;
    a vehicle speed detection unit that detects a vehicle speed; and
    a vehicle speed maintenance depression amount setting unit that sets an amount of depression of the accelerator pedal for maintaining a current vehicle speed as a vehicle speed maintenance depression amount,
    wherein the vehicle speed maintenance depression amount is set such that the vehicle speed maintenance depression amount increases with increase in the vehicle speed,
    wherein, when the pedal depression amount exceeds the vehicle speed maintenance depression amount, the target depression reaction force setting unit performs a first increase process in which the target depression reaction force is increased by a first increase amount.

2. The accelerator pedal reaction force control device according to claim 1, wherein the vehicle speed maintenance depression amount setting unit sets a value obtained by adding a predetermined value to an amount of depression of the accelerator pedal for maintaining the current vehicle speed when the vehicle is traveling on a flat road as the vehicle speed maintenance depression amount.

3. The accelerator pedal reaction force control device according to claim 1, further comprising a traveling state determination unit that determines whether the motor vehicle is in a first state of making the vehicle travel at a constant speed or a second state of making the vehicle travel at a constant speed,
    wherein the traveling state determination unit determines that the motor vehicle is in the first state of making the vehicle travel at a constant speed when a driving resistance caused by a road on which the vehicle is traveling currently is less than a predetermined value, and that the motor vehicle is in the second state of making the vehicle travel at a constant speed when a driving resistance caused by a road on which the vehicle is traveling currently is greater than a predetermined value,
    wherein, when it is determined by the traveling state determination unit that the vehicle is in the second state of making the vehicle travel at a constant speed, the target depression reaction force setting unit does not perform the first increase process.

4. The accelerator pedal reaction force control device according to claim 3, wherein the traveling state determination unit acquires a road slope, and determines that the vehicle is in the second state of making the vehicle travel at a constant speed when the road on which the vehicle is traveling currently has an upward slope.

5. The accelerator pedal reaction force control device according to claim 1, wherein the target depression reaction force setting unit does not perform the first increase process when the vehicle speed obtained by the vehicle speed detection unit is lower than a first vehicle speed.

6. The accelerator pedal reaction force control device according to claim 1, further comprising an acceleration depression amount setting unit that sets an amount of depression of the accelerator pedal for accelerating the motor vehicle from a current vehicle speed as an acceleration depression amount,
  wherein, when the pedal depression amount exceeds the acceleration depression amount, the target depression reaction force setting unit performs a second increase process in which the target depression reaction force is increased by a second increase amount larger than the first increase amount.

7. The accelerator pedal reaction force control device according to claim 6, wherein the acceleration depression amount setting unit sets the acceleration depression amount such that an increase gradient of the acceleration depression amount corresponding to an increase in the vehicle speed is smaller in a low speed range than in a high speed range.

8. The accelerator pedal reaction force control device according to claim 6, further comprising:
  a cruising state determination unit that determines that the motor vehicle is in a cruising state when the vehicle speed is maintained within a predetermined vehicle speed range for a predetermined time period;
  an acceleration detection unit that detects an acceleration of the motor vehicle; and
  an acceleration state determination unit that determines that the motor vehicle is in an acceleration state when a state in which the acceleration is larger than or equal to a predetermined value has continued for a predetermined time period,
  wherein the target depression reaction force setting unit performs the first increase process only when it is determined by the cruising state determination unit that the motor vehicle is in the cruising state, and performs the second increase process only when it is determined by the acceleration state determination unit that the motor vehicle is in the acceleration state.

9. An accelerator pedal reaction force control device for controlling a depression reaction force of an accelerator pedal provided to a motor vehicle, comprising:
  a reaction force providing unit that provides the accelerator pedal with a depression reaction force;
  a target depression reaction force setting unit that sets a target depression reaction force;
  a depression amount detection unit that detects an amount of depression of the accelerator pedal as a pedal depression amount;
  a vehicle speed detection unit that detects a vehicle speed; and
  an acceleration depression amount setting unit that sets an amount of depression of the accelerator pedal for accelerating the motor vehicle from a current vehicle speed as an acceleration depression amount,
  wherein the acceleration depression amount setting unit sets the acceleration depression amount such that an increase gradient indicating an increase in the acceleration depression amount relative to an increase in the vehicle speed is smaller in a low speed range than in a high speed range,
  wherein, when the pedal depression amount exceeds the acceleration depression amount, the target depression reaction force setting unit increases the target depression reaction force.

10. The accelerator pedal reaction force control device according to claim 9, further comprising a vehicle speed maintenance depression amount setting unit that sets an amount of depression of the accelerator pedal for maintaining a current vehicle speed as a vehicle speed maintenance depression amount,
  wherein, when the pedal depression amount exceeds the vehicle speed maintenance depression amount, the target depression reaction force setting unit increases the target depression reaction force by a first increase amount, and when the pedal depression amount exceeds the acceleration depression amount, the target depression reaction force setting unit increases the target depression reaction force by a second increase amount larger than the first increase amount.

* * * * *